June 20, 1933.  D. D. PEEBLES  1,914,895

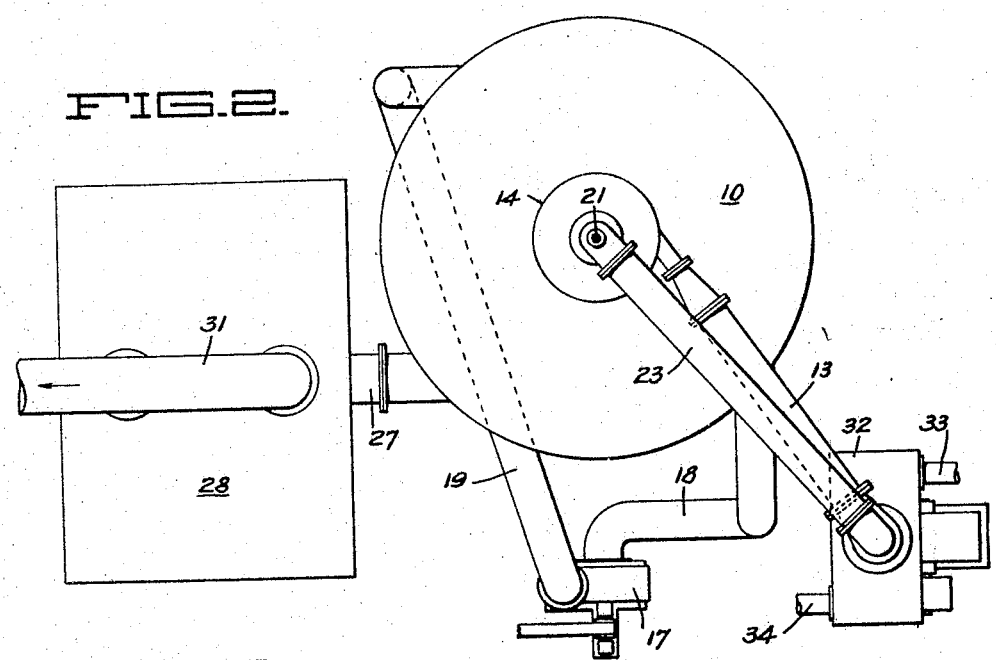
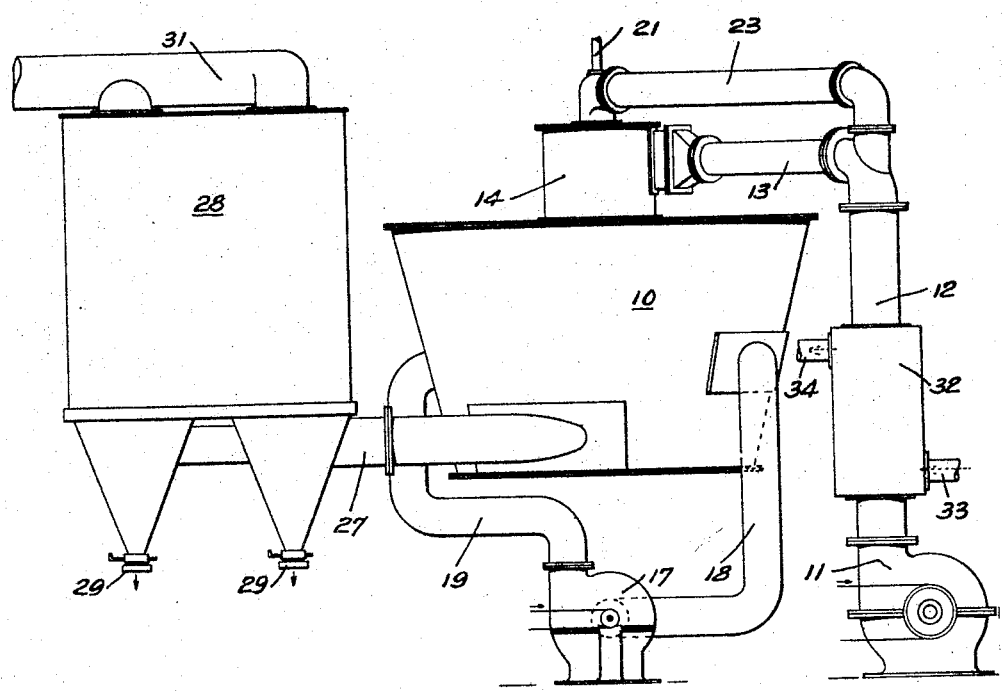

DESICCATING METHOD AND APPARATUS

Filed July 16, 1928   2 Sheets-Sheet 2

INVENTOR:
David D. Peebles
BY White, Prost & Fryer
ATTORNEYS.

Patented June 20, 1933

1,914,895

UNITED STATES PATENT OFFICE

DAVID D. PEEBLES, OF EUREKA, CALIFORNIA

DESICCATING METHOD AND APPARATUS

Application filed July 16, 1928. Serial No. 293,198.

This invention relates generally to methods and apparatus for treating a fluid suspension of solids in a gaseous medium. More particularly it relates to methods and apparatus for desiccating divided solids, especially organic material such as milk products. The invention, however is not to be understood as restricted to the treatment of organic materials.

It is an object of this invention to devise a novel method and apparatus for sustaining swirling air currents within a chamber used in the treatment of divided material.

It is a further object of this invention to generally improve upon apparatus of the general character described in my copending application No. 164,991 filed January 31, 1927, since matured into U. S. Letters Patent No. 1,830,174 whereby its operation is made more economical and effective.

It is a further object of this invention to devise a novel method and apparatus particularly adapted for the drying or desiccating of organic substances such as milk products and which makes possible the use of relatively high drying temperatures.

Further objects of my invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view in cross section illustrating apparatus incorporating my invention.

Fig. 2 is a plan view of the apparatus shown in Fig. 1.

Figure 3:
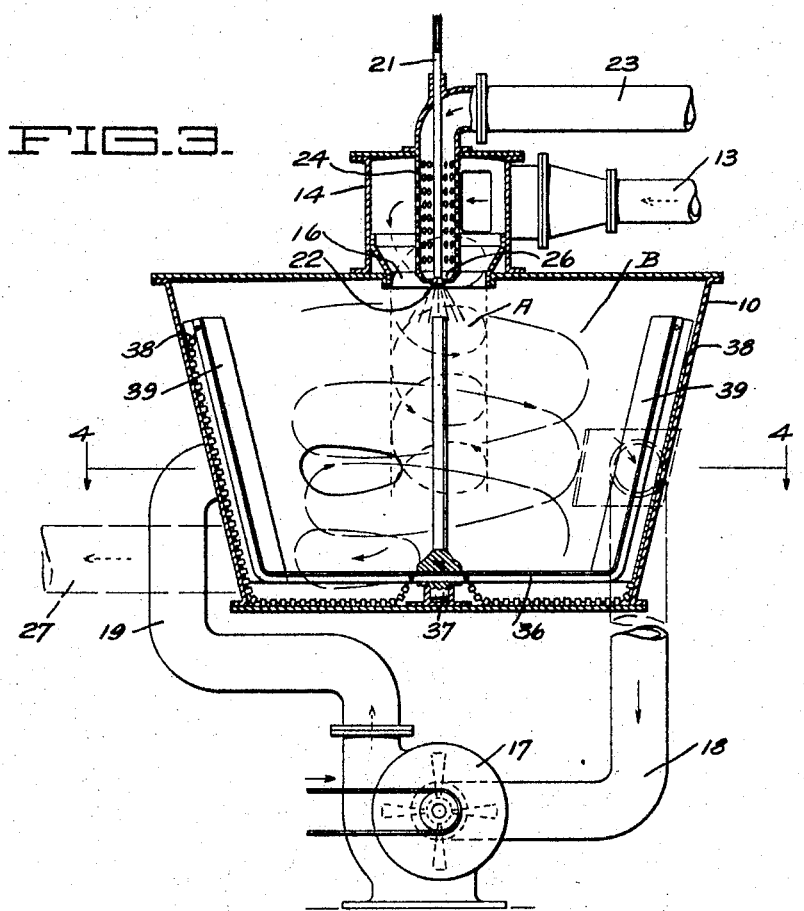
Fig. 3 is a side elevational view in cross section illustrating the treatment chamber which I employ and its associated parts.

In my aforementioned application No. 164,991 filed Jan. 31, 1927, I have disclosed a novel method and apparatus for effecting treatment of divided solids in a gaseous medium, one of the principal features of which is the use of a plurality of nested zones within a treatment chamber, formed by currents of air swirling in opposite directions. Divided solids to be treated are introduced into the inner zone and after being carried about in suspension by the gas, are removed from the system from one of the outer zones. By utilizing a plurality of zones of this character within a single treatment vessel, the solids have a comparatively long period of suspension before being removed from the chamber and are effectively contacted by the currents of gas because of deceleration and acceleration of the particles when moving from one zone to another. I have found that with such a method it is possible to maintain two or more temperature zones within the chamber, corresponding to the different zones of swirling gas currents. As will be presently described, I have also devised a novel method and apparatus for maintaining the outer zone of swirling gas within a treatment chamber. References herein to the introduction of divided solids into the treatment chamber are intended to include cases in which solids are introduced in suspension or solution in liquid.

In Figs. 1 and 2, I have illustrated an installation of my apparatus particularly for the purpose of drying milk products. In this case a treatment chamber 10 is provided, and this chamber is supplied with gas from a suitable source such as a fan or blower 11 which is connected to chamber 10 thru conduits 12 and 13. To provide a convenient means for forming an inner zone of swirling gas currents within the treatment chamber 10, I prefer to introduce the gas from conduit 13 tangentially into a sub-chamber 14 which communicates with the upper portion of treatment chamber 10 thru an opening 16. To provide means for forming an outer zone of swirling gas currents, I preferably provide a suitable gas moving device such as a blower 17 having its intake conduit 18 connecting with chamber 10 and its discharge conduit 19 connected tangentially with the peripheral portion of chamber 10. The tangential direction in which conduit 19 is directed is opposite to that in which conduit 13 is directed. The intake conduit 18 can be connected with the treatment chamber 10 at a number of different points, although I prefer to make this connection near the outer periphery of chamber 10, and likewise I prefer to make it tangentially so as to aid in inducing swirling currents of air.

The material to be treated, as for example a liquid milk product, is introduced into chamber 10 thru pipe 21, this pipe preferably discharging thru a suitable spray nozzle 22 which is arranged at or near the vertical axis of the chamber 10. In addition to the discharge thru conduit 13 I prefer to also introduce gas into the inner portion of sub-chamber 14, for a purpose which will be presently made clear. To effect this result, I have shown a conduit 23 connected with the discharge conduit 12 of blower 11 and to the upper portion of the sub-chamber 14. Within the sub-chamber 14, there is provided a perforated member 24 communicating with conduit 23, and having its lower end provided with an opening 26 surrounding and adjacent to the nozzle 22.

Instead of effecting separation between gas and solids within the treatment chamber 10, I prefer to continuously remove gas from the treatment chamber together with suspended solids. For example I have shown a discharge conduit 27 connected tangentially with the peripheral portion of treatment chamber 10. Conduit 27 preferably conveys the fluid suspension of solids and gas to suitable separating means 28, from which the separated solids can be removed from the lower opening 29 and from which the separate gas is discharged thru conduit 31. As my apparatus and method is designed particularly for effecting drying of material, I preferably heat the air introduced thru conduits 13 and 23. For this purpose I have shown the air discharged from blower 11 passing thru a suitable heater 32, this heater having pipe connections 33 and 34 for inflow and discharge of heating fluid.

In order to prevent solids from sticking to the inner walls of the treatment chamber I prefer to employ a rotary brush or rake comprising a frame 36 pivotally mounted at 37 to rotate within the chamber. Chains 38 are secured to this frame and serve to scrape the inner walls. Vanes 39 effect rotation by reaction with the swirling gas.

Figure 4:
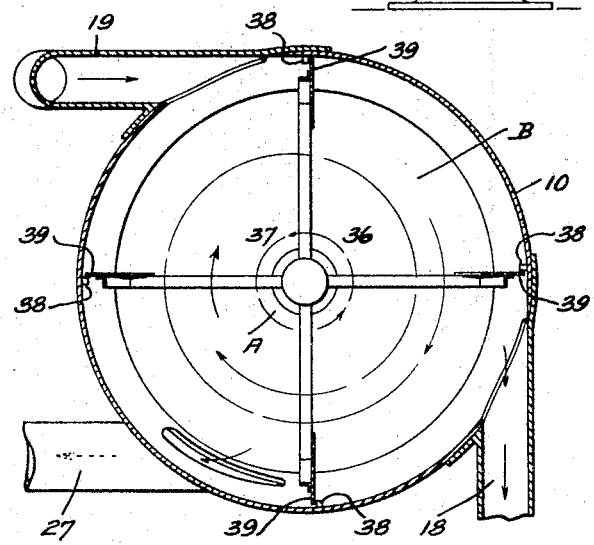
Fig. 4 is a cross sectional view taken along the line 4—4 of Fig. 3.

The operation of my method can best be understood by reference to Figs. 3 and 4. By continuously introducing air or other suitable gas thru conduit 13 with considerable velocity, a zone A is formed which consists of swirling currents of air. The motion of this air is cyclonic, or may be termed "vortical". Simultaneous operation of blower 17 removes gas and suspended solids from the chamber and reintroduces the same tangentially thru the conduit 19. The kinetic energy of gases discharged from conduit 19 causes another zone B of swirling currents of gas about the zone A. Because of the direction in which gases are discharged from conduit 19, the currents of gas in the outer zone B move about and in an opposite direction to movement of gas currents in zone A. The movements of the gas currents in zones A and B is sufficiently rapid that these zones are maintained distinct and separate. As gas is continuously introduced into the inner zone A, this gas progresses into zone B, a portion is removed and reintroduced thru conduit 19, and a portion finds its way into the discharge conduit 27. The kinetic energy imparted to gas forming the zone A is dissipated along the outer periphery of this zone and the movement of gas is decelerated and then accelerated in the opposite direction when it is caught up by the air currents in zone B. When solid particles are introduced into the inner zone A, as for example milk sprayed thru the nozzle 22, these solid particles are caught up and caused to swirl about together with the air currents. Due to centrifugal force, the solid particles tend to progress toward the outer portion of zone A, where they are decelerated in attempting to progress from zone A to zone B. When the particles begin to enter zone B, they are caught up by this zone and accelerated to again swirl in a direction opposite to the swirling movement in zone A. Finally the particles find their way into the discharge conduit 27.

When drying solids, it is apparent that the particles are under favorable drying conditions while within the chamber 10. The movement of each particle involves both acceleration and deceleration in the passage thereof outwardly thru the inner swirling zone and into the outer swirling zone, and since the particles themselves are caused to swirl about, the extent or time of contact between the gases and the particles will be of such a nature as to give optimum drying effect.

The introduction of gas thru conduit 23 is not essential but is to be preferred for best results. The effect of introducing gas at this point is to increase the pressure within the inner portion of sub-chamber 14, and thus increase the gas pressure of the inner portion of zone A. The net result accomplished is to prevent the solid particles introduced from being drawn up into the sub-chamber 14.

In using my method and apparatus, it is possible to introduce the gas thru conduits 13 and 23 at a relatively high temperature, without injuriously effecting organic substances, as for example milk products. For example when using the apparatus as a milk dryer, I utilize a temperature of air introduced thru conduits 13 and 23 in the neighborhood of 400 degrees F. When operating under these conditions the temperature of the saturated air being discharged from conduit 27 is in the neighborhood of 220 degrees F. When the milk is introduced into zone A, it is first subjected to dry air at the maximum temperature, but since the particles at this time have a maximum amount of moisture, evaporation of this moisture keeps the temperature of the particles at a much lower temperature at which the particles are not injured. As the percentage of moisture entrained by the particles decreases, they cannot withstand such a high temperature without injury. However when this takes place, the particles are in the outer zone B and the temperature of the surrounding gas is correspondingly lower. Thus in my method it is to be noted that the particles when in wet condition are first subjected to a high temperature air or drying medium, and as the moisture content of the particles decreases, the temperature of the surrounding air is correspondingly decreased and the humidity of the surrounding air is correspondingly increased. At the point of discharge, the temperature of the air is lowest, the humidity is greatest, and the moisture content of the particles is least.

I claim:

1. In a method of treating divided solids carried by a gas characterized by the use of a treatment chamber, the steps of continuously introducing gas and said solids into said chamber, continuously removing gas and solids from said chamber, separating solids from a portion of the gas so removed, and continuously reintroducing another portion of the removed gas and solids into the chamber adjacent the periphery thereof in a tangential direction.

2. In a method of treating divided solids carried by a gas characterized by the use of a treatment chamber, the steps of continuously introducing gas and suspended solids into the chamber, causing said gas to swirl about at a rapid rate within the chamber, removing gas and suspended solids from the chamber and reintroducing the same into the chamber in a tangential direction to effect a swirling of gas around said first swirling movement and in an opposite direction, and removing treated solids from the system.

3. A drying apparatus comprising a chamber, means for introducing heated gas and suspended solids into said chamber, means for causing introduced gas and solids to swirl about in an inner zone of said chamber, and means for causing gas and suspended solids to swirl about in a zone surrounding said inner zone and in an opposite direction, said means comprising means for removing gas from the chamber and for introducing the same into the chamber in a tangential direction.

4. A drying apparatus comprising a chamber, means for introducing heated gas and suspended solids into said chamber, means for causing introduced gas and solids to swirl about in an inner zone of said chamber, means for causing gas and suspended solids to swirl about in a zone surrounding said inner zone and in an opposite direction, said means comprising means for removing gas from the chamber and reintroducing the same into the chamber in a tangential direction, and means for continuously removing suspended treated solids from the system.

5. A drying apparatus comprising a chamber, means for introducing heated gas and suspended solids into said chamber, means for causing introduced gas and solids to swirl about in an inner zone of said chamber, means for causing gas and suspended solids to swirl about in a zone surrounding said inner zone and in an opposite direction, said means comprising means for removing gas from the chamber and reintroducing the same into the chamber in a tangential direction, means for separating gas from suspended treated solids, and means for conveying gas and treated suspended solids from said chamber to said separating means.

6. A drying apparatus comprising a chamber, means for introducing heated gas and suspended solids into said chamber in a tangential direction thereby causing the gas to swirl about in an inner zone of said chamber, means for causing gas and suspended solids to swirl about in a zone surrounding said inner zone and in an opposite direction, said means comprising means for removing gas from the chamber and reintroducing the same into the chamber in a tangential direction, means for separating gas from treated solids, and means for conveying gas and treated suspended solids from said chamber to said separating means.

7. A drying apparatus comprising a chamber, means for introducing a relatively high temperature drying gas into said chamber to form an inner high temperature zone, means for introducing material to be desiccated in divided condition into said inner zone, and means for forming a substantially lower temperature outer zone about and communicating with said inner zone, said means including means for removing gas and material from the outer zone and for reintroducing the same into said outer zone.

8. A drying apparatus comprising a chamber, means for introducing a column of high temperature drying gas into the chamber adjacent the axis of the same, thereby forming an inner high temperature zone, means for forming a relatively low temperature zone of swirling gas about and communicating with the inner zone, said means including a conduit for removing gas and particles from the outer zone, a conduit for reintroducing removed gas into the outer zone, a blower for causing a flow of gas thru said conduits, means for introducing divided material to be dried into the inner zone, and means externally of said chamber for continually separating dried particles from the gas.

9. A drying apparatus comprising a chamber, means for introducing a relatively high temperature drying gas into said chamber to form an inner high temperature zone, means for introducing material to be desiccated into the inner zone in divided condition, means for forming a substantially lower temperature zone of gas swirling about the inner zone, said means including a conduit for removing gas and suspended solids from the outer zone, a blower having its inflow side connected to said conduit, and a conduit connecting the outflow side of the blower to said outer zone, said blower and conduits serving to reintroduce gas into the outer zone without effecting separation of suspended solids, means for continually diverting gas and suspended solids from the chamber, and means externally of said chamber for effecting a separation of dried particles from said last mentioned gas.

10. In a method of desiccating material characterized by the use of a desiccating chamber, the steps of continuously introducing desiccating gas and divided particles of the material into the chamber to effect a suspension of the particles in the gas, maintaining a high temperature zone and relatively a low temperature zone in said chamber, the gas and particles being initially introduced to said high temperature zone, continuously passing gas and particles from the high temperature zone into the low temperature zone, continuously removing gas and suspended particles from the low temperature zone, reintroducing a portion of the removed gas and suspended particles into the low temperature zone without effecting a separation between the particles and gas, and effecting a separation of the particles from the remaining portion of the removed gas externally of said chamber.

11. The method as defined in claim 10 further characterized in that said low temperature zone surrounds said high temperature zone.

12. The method as defined in claim 10 further characterized in that said low temperature zone surrounds said high temperature zone and in that the gas and particles in the two zones are swirled in opposite directions.

13. In a method of desiccating material characterized by the use of a desiccating chamber, the steps of continuously introducing desiccating gas and divided particles of the material into the chamber to effect a suspension of the particles in the gas, maintaining a high temperature zone and relatively a low temperature zone in said chamber, the gas and particles being initially introduced to said high temperature zone, continuously passing gas and particles from the high temperature zone into the low temperature zone, swirling the gas and particles in the high temperature zone in one direction while swirling the gas and particles in the low temperature zone in the opposite direction, continuously removing gas and suspended particles from the low temperature zone, reintroducing a portion of the removed gas and suspended particles into the low temperature zone without effecting a separation between the particles and gas, and effecting a separation of the particles from the remaining portion of the removed gas externally of said chamber.

14. In a method of treating divided solids carried by a gas characterized by the use of a treatment chamber, the steps of continuously introducing gas and said solids into said chamber adjacent the center thereof, continuously removing gas and solids from the periphery of said chamber, separating solids from a portion of the gas so removed and continuously reintroducing another portion of removed gas and solids into the chamber adjacent the periphery thereof in a tangential direction.

15. In a method of the character described, characterized by the use of a treatment chamber, the steps which comprise introducing gaseous medium at relatively high temperature adjacent the central portion of said chamber and causing such gaseous medium to swirl within an inner zone in said chamber, introducing non-gaseous material in divided form into the relatively high temperature gaseous medium in said inner zone and causing such material to move outwardly through said inner zone by centrifugal force, continually removing gaseous medium at relatively low temperature from said chamber outside said inner zone and reintroducing such gaseous medium into the outer portion of said chamber in a substantially tangential direction opposite to the direction of whirling movement in said inner zone, so as to maintain an outer swirling zone of gaseous medium of relatively low temperature swirling in the opposite direction to the gaseous medium in the inner zone, and in position to receive the divided material thrown out of said inner zone by centrifugal force, whereby said divided material is caused to also whirl in said outer zone and is prevented by centrifugal force from returning to said inner zone.

16. The method of treating a non-gaseous material by contact with a heated gaseous medium in a treatment chamber, which comprises introducing finely divided particles of non-gaseous material to be treated into suspension in a gaseous medium within a treatment chamber, continually withdrawing gaseous medium and suspended particles of said material from said chamber and re-introducing said gaseous medium and particles into said chamber so as to maintain recirculation thereof in a closed system including said chamber, retaining substantially all the particles of material in suspension in said gaseous medium throughout the recirculation system, heating a supply of gaseous medium separate from the recirculated gaseous medium and introducing said heated gaseous medium into the recirculation system, continually removing gaseous medium and suspended particles from the recirculation system at a position removed from the position of introduction of said heated gaseous medium, and separating suspended particles from the gaseous medium so removed.

17. The method as set forth in claim 16, in which the non-gaseous material to be treated and the supply of heated gaseous medium are both introduced into the treatment chamber adjacent the central portion thereof, while the recirculated gaseous medium and suspended particles are reintroduced into the treatment chamber adjacent the periphery thereof and in a substantially tangential direction so as to maintain active whirling movement of the recirculated gaseous medium and suspended particles within an outer zone in said chamber.

18. The method as set forth in claim 16, in which said heated gaseous medium is introduced into the recirculation system by introducing the same into the treatment chamber adjacent the position of introduction of said non-gaseous material to be treated.

19. The method as set forth in claim 16, in which the heated gaseous medium is introduced into the recirculation system by introducing the same adjacent the position of introduction of the non-gaseous material to be treated and in such manner as to cause said heated gaseous medium to contact first the freshly introduced non-gaseous material so as to be cooled thereby before coming in contact with the suspended particles contained in the recirculated gaseous medium.

In testimony whereof, I have hereunto set my hand.

DAVID D. PEEBLES.